(12) United States Patent
Hayashida

(10) Patent No.: US 6,484,564 B1
(45) Date of Patent: Nov. 26, 2002

(54) LIQUID LEAKAGE SENSOR, PAPER FOR DETECTING LIQUID LEAKAGE, AND HOLDER FOR DETECTING LIQUID LEAKAGE

(75) Inventor: Tatekazu Hayashida, Tokyo (JP)

(73) Assignee: Tsuden Kabushiki Kaisha, Kanagawa (JP)

( * ) Notice: Subject to any disclaimer, the term of this patent is extended or adjusted under 35 U.S.C. 154(b) by 0 days.

(21) Appl. No.: 09/536,230

(22) Filed: Mar. 27, 2000

(51) Int. Cl.[7] .......................... G01M 3/38; G01N 21/43
(52) U.S. Cl. ........................ 73/40; 250/559.4; 250/573; 250/574; 340/605; 340/619; 356/432; 356/436; 356/440; 356/445
(58) Field of Search ............... 73/40, 40.7, 45.5; 250/227.28, 301, 559.4, 573, 574; 340/605, 619, 604; 356/432, 445, 436, 440

(56) References Cited

U.S. PATENT DOCUMENTS 4,689,484 A  *  8/1987  McMahon .................. 340/605

FOREIGN PATENT DOCUMENTS

| JP | 63-201546 | * 8/1988 | ................. 356/432 |
| JP | 01-260339 | * 10/1989 | ............ 250/227.28 |
| JP | 4-70572 | 11/1992 | ................. 73/40.7 |

* cited by examiner

Primary Examiner—Daniel S. Larkin
(74) Attorney, Agent, or Firm—Ladas & Parry

(57) ABSTRACT

A liquid leakage sensor, paper for detecting liquid leakage, and holder for detecting liquid leakage stably and reliably without being affected by bubbles when a large volume of liquid leaks at once. A liquid leakage sensor also has a tilt detection capability that does not use a test paper and can quickly and reliably detect liquid leakage even before the liquid contacts the case bottom.

2 Claims, 13 Drawing Sheets

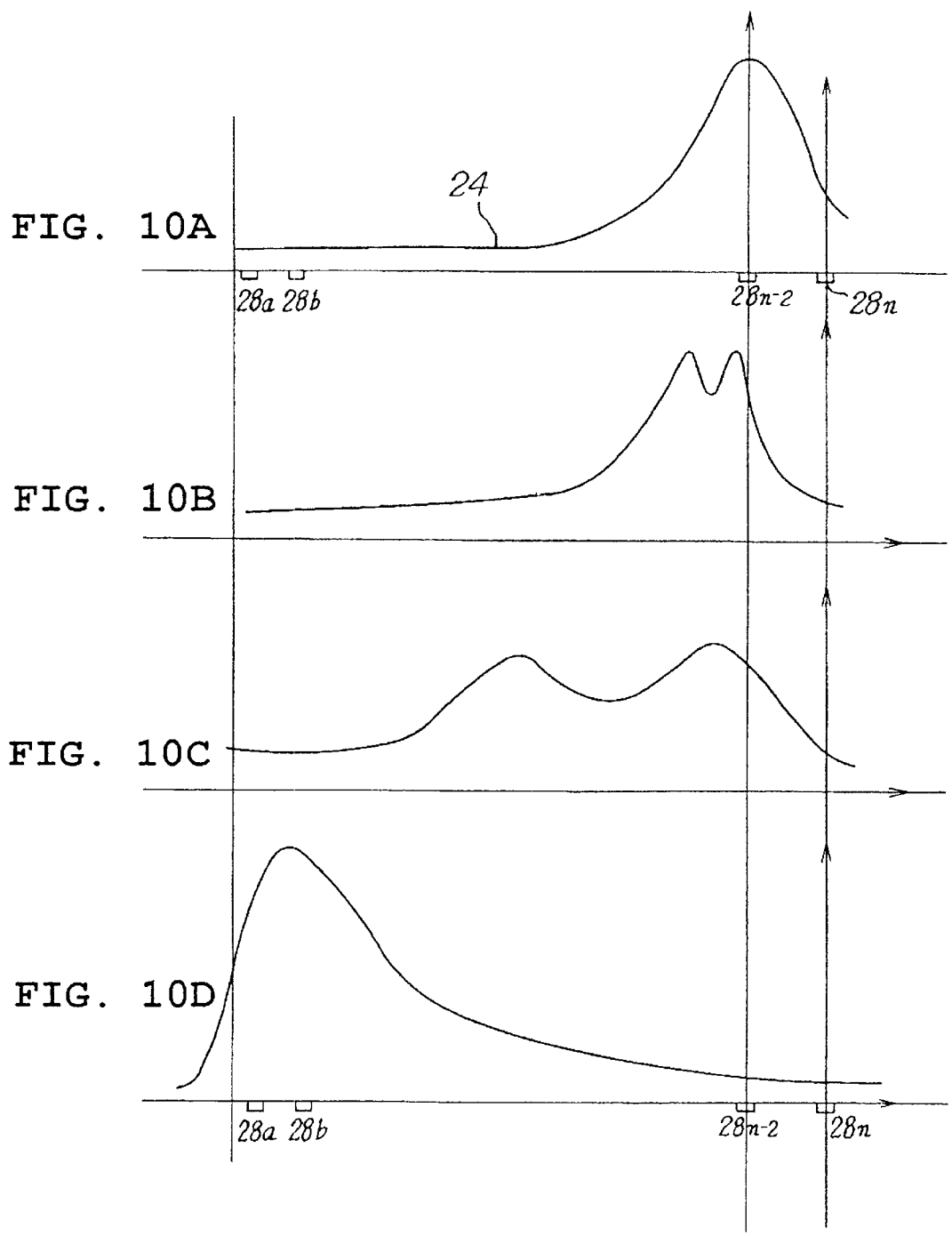

LIQUID LEAKAGE SENSOR, PAPER FOR DETECTING LIQUID LEAKAGE, AND HOLDER FOR DETECTING LIQUID LEAKAGE

BACKGROUND OF THE INVENTION

1. Field of the Invention

The present invention relates to an improvement of a liquid leakage sensor for reliably detecting leakage of water, an acid solution, an alkaline solution, or other liquid that is electrically conductive, or leakage of alcohol, thinner, benzene, or other organic liquid that has dielectric properties, without being affected by bubbles.

2. Description of Related Art

Liquids are typically supplied through pipes to equipment in manufacturing plants. This requires the use of numerous joints and couplings to connect sections of pipe, and leakage of liquid from these joints is common. Depending on the type of liquid being used, regular manual inspection is required to check for leakage. Typical liquid leakage detection methods include conductive and volumetric techniques. Japanese Examined Patent Application Publication (kokoku) 4-70572 teaches a liquid leakage sensor technology for reliably detecting liquid leakage by emitting light from a light source to a filter that turns transparent when it absorbs liquid, producing a change in light transmitted or reflected by the filter when there is liquid leakage. This change in transmitted or reflected light is used to reliably detect liquid leakage.

FIG. 1A illustrates the principle of this conventional reflection type liquid leakage sensor 20. A test paper and case holder 4 of which the bottom 4a is coated black is fastened by a screw or other fastener 6 to floor 1, and a white test paper (or cloth or synthetic resin) 8 is placed flat over bottom 4a. The bottom 4a is also a reflector. A case 12 of which the bottom 12a is transparent or semi-transparent is inserted to holder 4. A light source 14, photodetector 16, and comparator or other detection means 18 are together housed inside the case 12 and connected by way of cable 26 to the outside of the case 12.

It should be noted that the case 12 also functions as a dustproof and water-resistant cover. However, to facilitate penetration of leaked liquid 2 to the reflection area 8b in the middle of paper 8, and shorten the liquid leakage detection time, a gap 10 is disposed between paper 8 and the case bottom 12a. This gap 10 is preferably no more than several millimeters in order to avoid contamination by dust and other foreign particulate, and to stably detect light reflected from paper 8 without also detecting external light noise. Replacing the paper 8 and installation are also made easier by constructing the filter so that the reflector 4a and case 12 are removable. It is also not generally possible to identify the source of liquid leakage. As a result, the paper 8 is also preferably round so as to respond more quickly to liquid leakage from any direction.

A liquid leakage sensor 20 thus comprised emits light 22 from the light source 14, which is typically an LED, infrared laser diode, or optical fiber, to continuously monitor white reflected light 24 from the paper 8 by means of photodetector 16. However, when leakage 2 occurs at the floor 1, leaked liquid 2 gradually penetrates from contact area 9 to the reflection area 8b of paper 8, and the contact area 9 of paper 8 turns from white to transparent due to liquid absorption. Because the reflector 4a below the paper 8 is black, the color of the paper 8 changes from white to black in the contact area 9. Light 22 from the light source 14 is thus absorbed by the reflector 4a, significantly reducing the amount of light 24 reflected to photodetector 16. The detection means 18 thus detects this change in reflected light, and senses liquid leakage.

The following problems not initially expected to occur with a conventional optical liquid leakage sensor as described above remain to be solved.

(A) When the holder bottom 4a is level to the floor 1 and the case bottom 12a is also substantially level, a high pressure line or large-diameter pipe bursts and a large volume of liquid leaks at once, the entire circumference of the bottom of case 12 is submerged in liquid at substantially the same time. When the leaked liquid 2 then penetrates gradually from the outside edge of the paper 8 toward the inside, the air in the gap 10 between holder bottom 4a and case bottom 12a becomes trapped (although part of the air escapes outside the case 12 as a bubble) in the center of the gap 10 and surrounded by the liquid. As shown in FIG. 1B, this bubble becomes trapped in the center of the reflection area 8b, preventing the reflection area 8b from turning transparent no matter how much time elapses. As a result, it is not possible to detect that a large volume of liquid has leaked.

(B) Large numbers of flat holders having a level bottom 4a are currently in use. Replacing each of the holders 4 fastened to floor 1 would require a massive amount of time, and is substantially impossible.

(C) In addition, paper 8 is a consumable and is thrown away each time liquid is detected. It is therefore preferable to be able to reuse the paper 8 << or eliminate use of the paper 8>>.

It should also be noted that the advantages of the liquid leakage sensor using paper 8 as described above include a simple design, reliable operation, stability and resistance to tipping over because it is fastened to the floor by a screw or other fastener, and the ability to detect high viscosity liquids in a relatively short period of time. On the other hand, users that would like to simplify or eliminate the work involved with installing the holder on the floor and replacing the test paper would like a liquid leakage sensor that does not use such paper and does not require floor installation.

Various liquid leakage sensors that do not use such a test paper have been proposed. These typically emit light to the bottom of the case, and evaluate the presence of liquid leakage by means of the amount of reflected light. However, if the case bottom is tight to the floor, it is very difficult for high viscosity liquids to penetrate to the middle of the case bottom. This means that the gap between the floor and the case bottom must be at the smallest at least 2 to 4 mm, which is significantly greater than in a sensor using paper as described above, and liquid leakage detection is not possible unless a large amount of liquid leaks so that the case bottom contacts the liquid.

Furthermore, if the case bottom is directly exposed to the floor surface, detection will be easily affected by the color of the floor surface, and when leaked liquid penetrates the sensor area, a large amount of unnecessary reflected light from the floor surface will also be detected, creating operating errors. Detection of liquid leakage based only on the amount of reflected light thus becomes unstable.

In addition, if the case is simply placed on the floor without fastening it to the floor, there is the danger of the case rising off the floor and even falling over.

SUMMARY OF THE INVENTION

The present invention was therefore conceived with consideration for the above-noted problems. An object of the invention is therefore to provide a liquid leakage sensor, paper for detecting liquid leakage, and a holder for detecting liquid leakage whereby liquid leakage can be stably and reliably detected without leakage detection being affected by bubbles even when a large volume of liquid leaks at one time.

A further object of the present invention is to provide a liquid leakage sensor, paper for detecting liquid leakage, and a holder for detecting liquid leakage whereby leakage of volatile liquids presenting the danger of flammable explosion can be remotely, safely, and reliably detected while taking care to prevent explosion and without leakage detection being affected by bubbles even when a large volume of liquid leaks at one time.

A yet further object of the present invention is to provide a liquid leakage sensor having a tilt detection function that does not use paper and can reliably, quickly detect liquid leakage even when the leaked liquid does not contact the case bottom.

To achieve this object, the present invention relates to a liquid leakage sensor comprising a white test paper that is made transparent by absorption of leaked liquid; a paper holder for holding level a test paper placed therein with the bottom of the paper holder forming a reflector; a case inserted to this holder and having a transparent or semi-transparent bottom; a light source for emitting light to the test paper through the transparent or semi-transparent bottom; a photodetector for detecting light reflected from the holder bottom; and a detector for detecting liquid leakage based on data from the photodetector. The light source and photodetector are housed together inside the case. A gap is formed between the holder and case so that leaked liquid penetrates rapidly when leaked liquid contacts one edge of the paper.

To achieve the above object with a liquid leakage sensor thus comprised, an asymmetrical opening is formed asymmetrically to the reflection area in a middle part not including the outside edge and reflection area of the paper when the shape of the paper is circular or noncircular so that a bubble is not trapped in the reflection area of the paper that is detected by the photodetector when a large volume of liquid leaks at once.

The present invention also relates to a liquid leakage sensor having at least one reflection plane able to contact leaked liquid, a light source, and a photodetection means. In this case, the object of the invention is achieved by projecting light to the reflection plane from the light source; detecting light reflected from the reflection plane by a plurality of photodetection means; applying an operation to photodetection means output to determine a brightness pattern distribution of the reflected light at a specific period; and determining the presence of liquid leakage from variation in the brightness pattern distribution of the reflected light.

The invention further relates to a liquid leakage sensor having at least one reflection plane able to contact leaked liquid; a case having a transparent or semi-transparent bottom; a light source for emitting light; a first light transmitting means for guiding light emitted from said light source to said reflection plane through the transparent or semi-transparent case bottom; a second light transmitting means for detecting and transmitting reflected light from the reflection plane; and a photodetection means for detecting light from said second light transmitting means.

A liquid leakage sensor thus comprised achieves an object of the present invention by forming an optical path from an end of the first light transmitting means and an end of the second light transmitting means housed inside the case. The second light transmitting means has a plurality of light transmitting elements whereby light is transmitted so that reflected light photodetection positions can be mutually distinguished. Positions at which reflected light is detected by the plural photodetection elements are converted at the other end of the second light transmitting means to electrical signals so as to be mutually distinguishable. Output of the photodetection means is then processed to determine at a specific period a brightness pattern distribution of the reflected light. Presence of liquid leakage is then detected from change in the brightness pattern distribution of reflected light.

An object of the present invention is further achieved by means of liquid leakage sensor having a first liquid leakage sensor and a second liquid leakage sensor. The first liquid leakage sensor has a first detection means having at least two reflection planes able to contact leaked liquid formed with a gas layer or a leaked liquid permeation layer disposed therebetween in the direction of light transmission; at least two light sources and photodetection means disposed on the same side of each reflection plane; emitting light from a first light source at an incidence angle equal to or greater than a critical angle to a first reflection plane nearest said light source; detecting reflected light from said first reflection plane by means of a first photodetection means; and processing said photodetection means output to detect liquid leakage. The second liquid leakage sensor has a second detection means for emitting light from a second light source at an incidence angle less than said critical angle to a reflection plane other than said first reflection plane, detecting reflected light from a reflection plane other than said first reflection plane by means of a second photodetection means, and processing said photodetection means output to detect liquid leakage.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 10A is a graph of the brightness pattern of reflected light when there is no liquid leakage in a liquid leakage sensor, FIG. 10B is a similar graph when there is a thin penetration of liquid leakage, FIG. 10C is a similar graph when there is a thicker penetration of liquid leakage, and FIG. 10D is a similar graph when there is an extremely thick penetration of liquid leakage;

DESCRIPTION OF THE PREFERRED EMBODIMENTS

The preferred embodiments of the present invention are described below with reference to the accompanying figures.

Figure 2A:
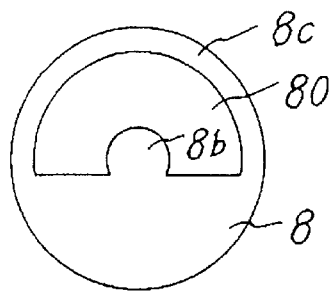
FIG. 2A shows the structure of paper for detecting liquid leakage according to the present invention.

FIG. 2A shows a liquid leakage sensor test paper 8 that can be used in both a reflection type liquid leakage sensor and a transmission type liquid leakage sensor according to the present invention. As shown in the figure, an asymmetrical opening 80 positioned asymmetrically to the reflection area 8b is disposed in the middle of the round paper 8 except in outside perimeter area 8c and reflection area 8b.

Figure 1A:
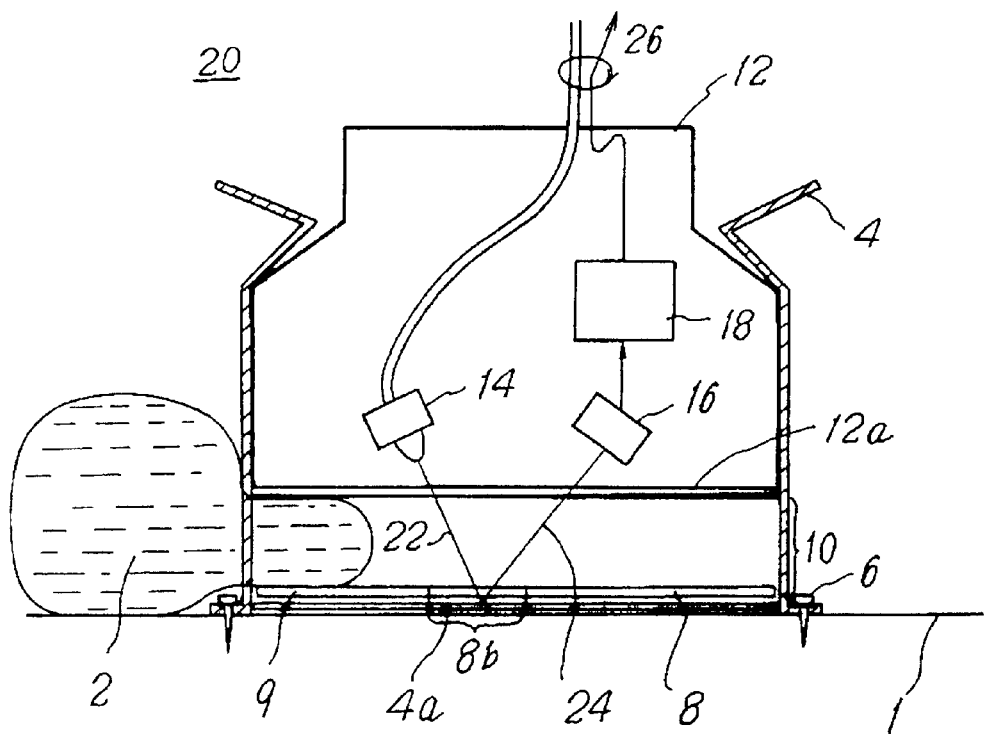
FIG. 1A shows the structure and operation of a conventional optical liquid leakage sensor.
Figure 1B:
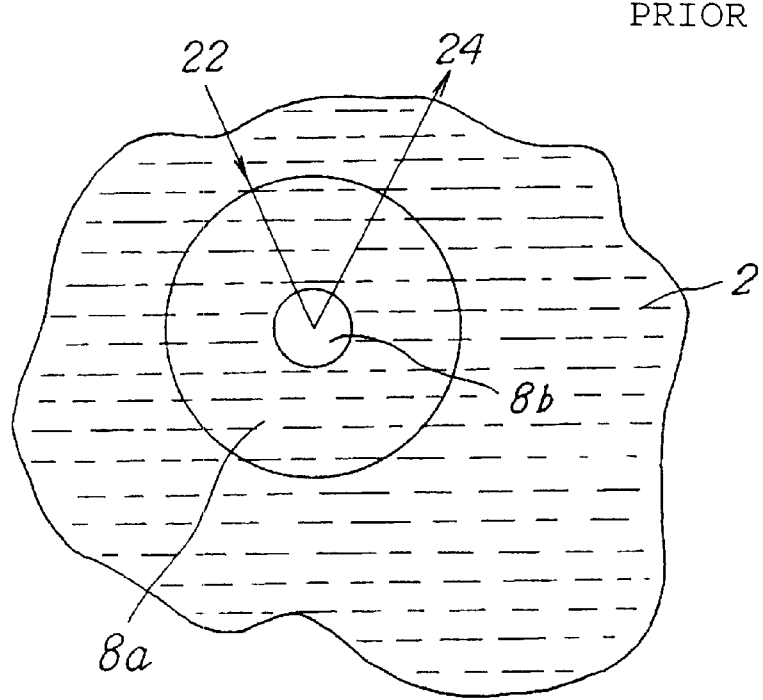
FIG. 1B shows the effect of a bubble trapped in the bottom of the liquid leakage sensor.
Figure 2B:
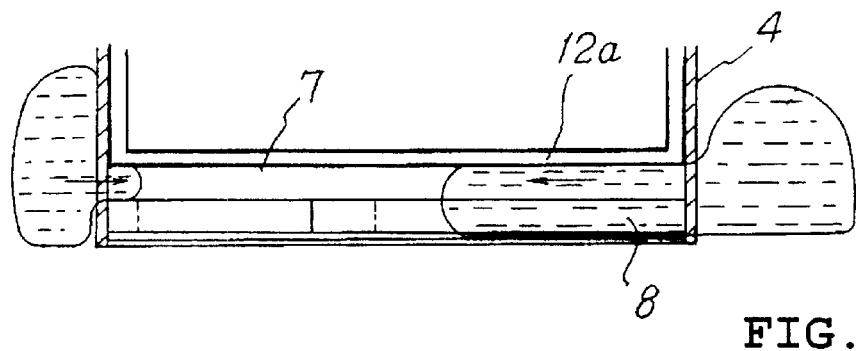
FIG. 2B is a section view showing penetration of liquid to the gap in bottom 12a, FIG. 2C is a plan view showing the path of liquid penetration to paper 8.
Figure 2C:
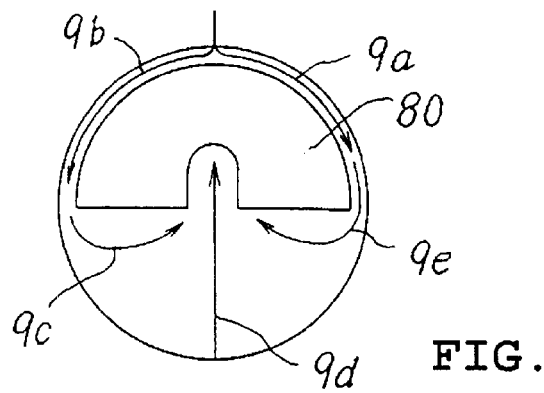
FIG. 2D is a section view describing the operation after the liquid penetrates to the reflection area 8b of the paper 8.
Figure 2D:
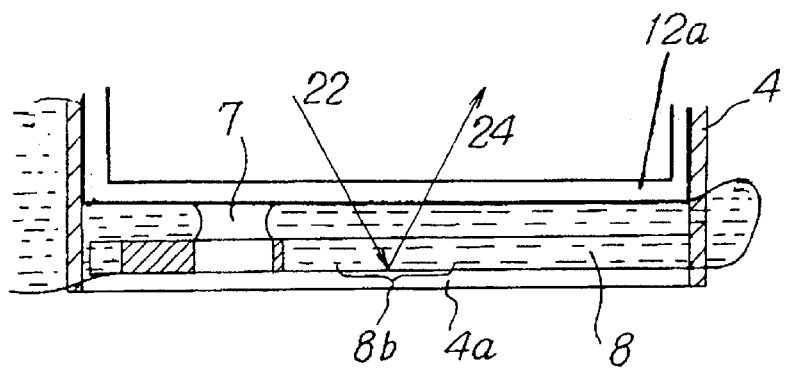

This paper 8 can be used to replace a conventional test paper while continuing to use the conventional holder 4 and case 12 as is (FIG. 2B). If leaked liquid then contacts a part of outside edge 9a, 9b, the presence of an opening 80 in the middle causes the liquid to gradually penetrate by way of route 9a to 9e or 9b to 9c to reflection area 8b. While the detection time in this case takes slightly longer than conventionally, the reflection area 8b changes from white to transparent, and the change in reflected light 24 can therefore be detected by means of the same principle described above with reference to FIGS. 1A and 1B. Liquid leakage can therefore be detected. In addition, liquid leakage can be detected in substantially the same amount of time as conventionally when part of the leaked liquid contacts outside edge 9c, 9d or 9e.

When a large volume of liquid leaks at once to the floor 1, the lack of an opening in the center of a conventional test paper 8 allows the liquid to permeate the paper 8 at substantially the same rate from all directions, thereby compressing and collecting any air or gas absorbed by the paper 8 and present in the gap (referred to below as simply air absorbed by the paper) into the center of the reflection area by means of the pressure generated by the liquid permeating the paper. A bubble 7 is then formed when the pressure of this air or gas is balanced with the pressure of the permeated liquid. This bubble 7 is thus trapped above the reflection area 8b, making liquid leakage detection impossible.

When an opening. 80 is provided in the center of the paper 8 as shown in FIG. 2A, however, the leaked liquid is absorbed from the outside edges to the center of the paper 8 at different rates. This causes the air absorbed by the paper to be gradually pushed into a bubble 7 in opening 80, thereby assuring that reflection area 8b is permeated by the leaked liquid 2. Experiments have shown that the reflection area 8b therefore reliably changes from white to transparent (FIG. 2B), allowing emitted light 22 to be absorbed by the black bottom 4a [4b, sic] of the holder 4, and enabling leaked liquid 2 to be detected.

Experiments have also demonstrated this phenomenon with water and such high viscosity solutions as hydrochloric acid and sulfuric acid. It is therefore possible by simply replacing the paper 8 in existing optical liquid leakage sensors with a paper 8 shaped as shown in FIG. 2A to reliably detect even sudden high volume leaks of liquid.

Figure 3A:
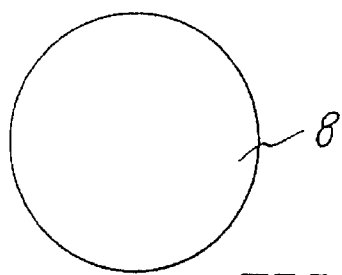
FIG. 3A shows a typical conventional paper for detecting liquid leakage 8 without an opening 80.
Figure 3B:
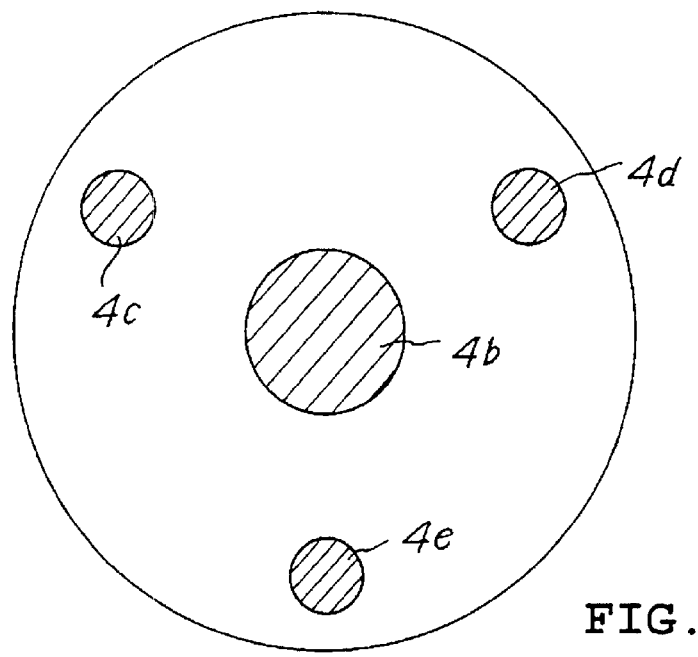
FIG. 3B is a plan view of an exemplary holder for detecting liquid leakage according to the present invention.
Figure 3C:
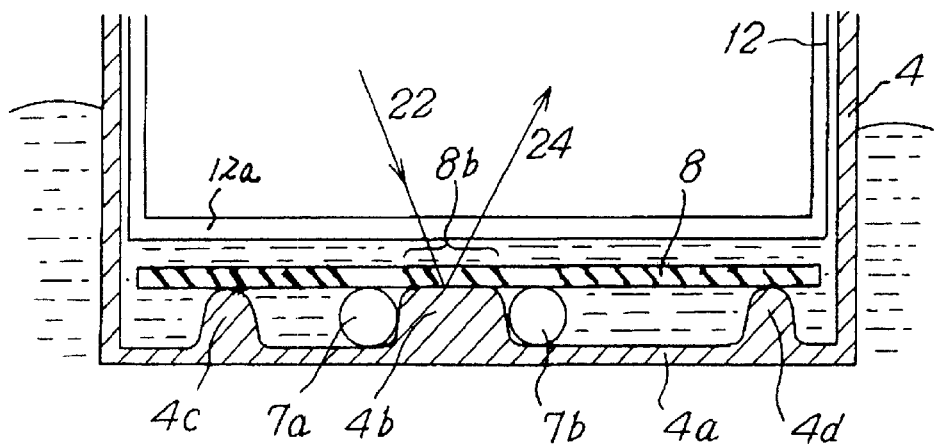
FIG. 3C is a section view describing the operation of this holder for detecting liquid leakage.

An alternative embodiment of the present invention is shown in FIGS. 3B and 3C in contrast with FIGS. 2A–2D. It should be noted that like parts are identified with like reference numerals in FIGS. 2A–2D and FIGS. 3B and 3C, and the functions of the liquid leakage sensors are the same in both cases.

A liquid leakage sensor according to this embodiment of the invention can achieve the same benefits of a sensor according to the first embodiment described above even when a conventional test paper 8 as shown in FIG. 3A is used. This is possible by disposing a plurality of protrusions 4b to 4e around the reflection area on the bottom 4a of the holder 4 as shown in FIG. 3B and FIG. 3C. As shown in FIG. 3C, the paper 8 is placed level on top of these protrusions 4b to 4e. When the paper 8 is then disposed between the bottom 12a of case 12 and these protrusions 4b to 4e, the distance between the paper 8 and holder bottom 4a is not uniform with the gap between protrusions 4b to 4e and paper 8 in particular being narrower than the gap to the bottom surface in other areas.

When thus comprised and leaked liquid 2 contacts part of the outside edge of the paper 8, the leaked liquid 2 gradually permeates to the middle of the paper 8 and reaches the center reflection area 8b. However, the presence of protrusion 4b on the bottom 4a of holder 4 near the reflection area 8b allows the leaked liquid 2 to rapidly permeate the paper around the protrusion 4b by means of capillary action. The reflection area 8b thus changes from white to transparent, thus greatly reducing reflected light 24. This change can be sensed by the photodetector 16 and detection means 18, and thereby output from the liquid leakage sensor.

When a large volume of leaked liquid 2 leaks at once to the floor 1, the leaked liquid 2 is absorbed from the outside edges to the center of the paper 8 at substantially the same rate. Air absorbed by the paper is thus pushed toward the center by this liquid permeation. Unlike the case shown in FIG. 1A, however, the liquid permeation pressure is significantly higher inside the area of protrusion 4b, that is, the reflection area 8b, than around it because of the protrusion 4b on holder bottom 4a, as shown in FIG. 3C. Therefore, if protrusion 4b is disposed to cover an area sufficiently larger than the size of bubble 7, the leaked liquid 2 can reliably reach the outside edge of protrusion 4b. Once the leaked liquid 2 reaches the outside edge of protrusion 4b, the permeation pressure generated in the area of the paper 8 disposed between protrusion 4b and bottom 12a is higher than the pressure in the surrounding area. The bubble compressed in reflection area 8b by this pressure is soon split into a plurality of bubbles 7a and 7b, as shown in FIG. 3C and forced outside of the area above protrusion 4b. The color of the reflection area 8b thus changes from white to transparent. As noted above, a reduction in reflected light 24 is thus detected and output from the liquid leakage sensor.

Figure 4A:
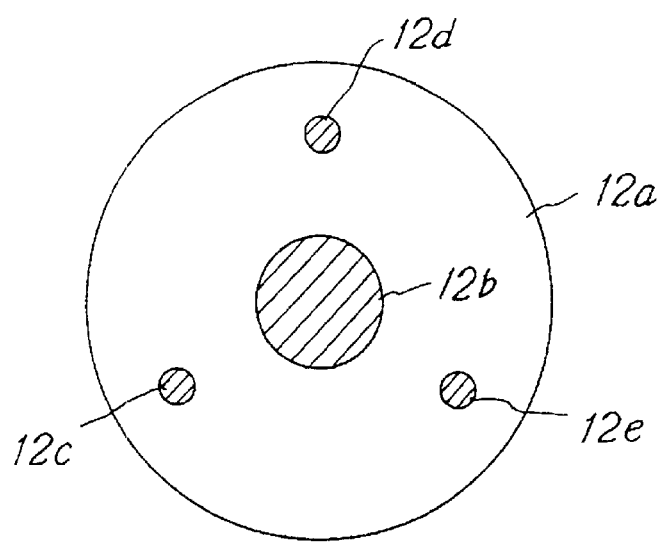
FIG. 4A is a plan view of the structure of the bottom of a case for a liquid leakage sensor according to the present invention.
Figure 4B:
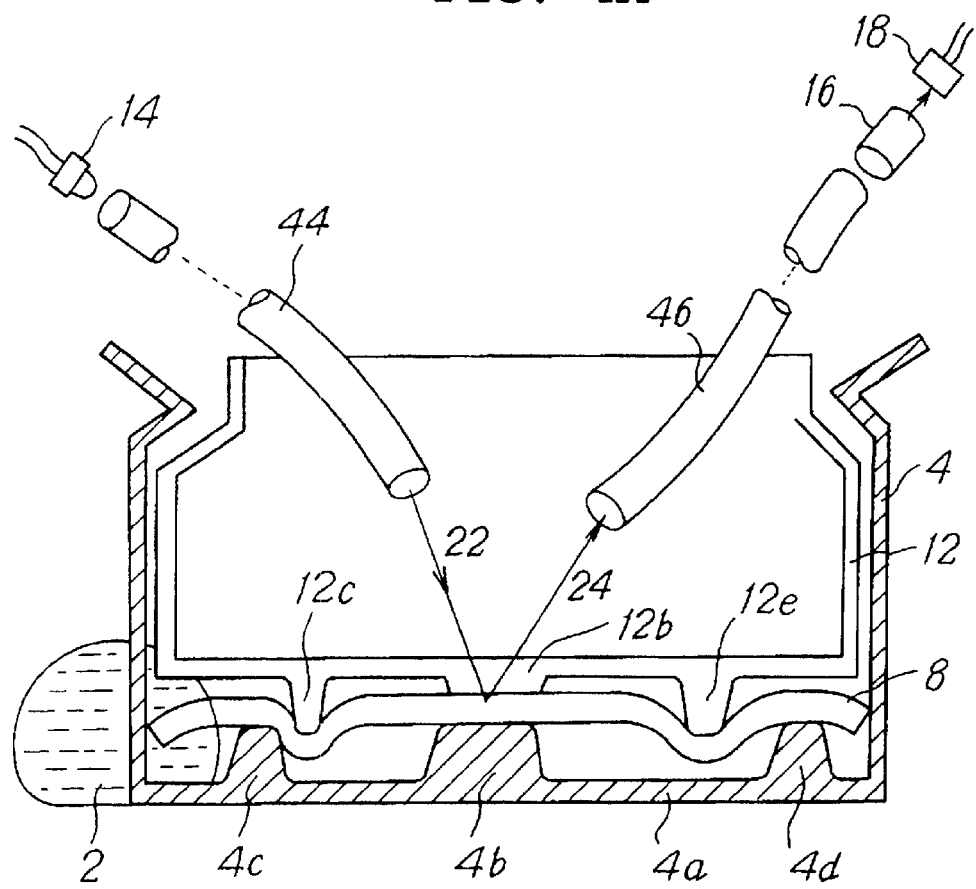
FIG. 4B is a section view showing the construction of an explosion-proof, reflection type liquid leakage sensor according to the present invention.

A further alternative embodiment of the present invention is shown in FIGS. 4A and 4B in contrast with FIGS. 1A–1B and FIGS. 3B–3C. It should be noted that like parts are identified with like reference numerals in FIGS. 4A and 4B, and each function of the liquid leakage sensor is the same in both cases.

In addition, however, a liquid leakage sensor according to this preferred embodiment of the invention further eliminates the presence of electrical wiring in the liquid leakage detection part. More specifically, optical fiber or other light transmitting means 44 and 46 are used to emit light to and detect light reflected from the reflection area 8b of paper 8. It is therefore possible for a liquid leakage sensor according to this preferred embodiment to very safely detect liquid leakage by means of reflected light even when the leaked liquid 2 is volatile and presents the danger of combustion or explosion.

With a liquid leakage sensor thus comprised, light from a remotely disposed light source 14 is guided by means of light transmitting means 44 to the bottom 12a of case 12, reflected light 24 from the reflection area 8b is guided by means of light transmitting means 46 to a remotely located photodetector 16, and the output of the photodetector 16 is processed by a detection means 18 to detect the presence of leaked liquid.

As also shown in FIG. 4A and FIG. 4B, a plurality of outwardly projecting protrusions 12b to 12e are disposed on the outside of the bottom 12a of case 12 around the area corresponding to reflection area 8b. The distance between paper 8 and case bottom 12a is therefore not the same in all places, and a paper 8 not having an opening therein can be used while still achieving the benefits of the first embodiment described above. In addition, the bottom 4a of holder 4 can be flat as shown in FIG. 1A, or a plurality of protrusions 4b to 4d can be provided as shown in FIG. 4B. When a case 12 as shown in FIG. 4B is used, if the area of the protrusion 12b corresponding to reflection area 8b is made sufficiently greater than the size (area) of bubble 7, leaked liquid 2 will reliably permeate through paper 8 to protrusion 12b by means of the same principle shown in FIG. 3C. The liquid permeation pressure is greater inside the area of protrusion 12b because the gap 10 inside the area of protrusion 12b is sufficiently narrower than the gap there around. As a result, air contained in the reflection area 8b of paper 8 is pushed outside the area of the protrusion 12b, and a bubble can thus be prevented from being trapped in the reflection area 8b.

Figure 5A:
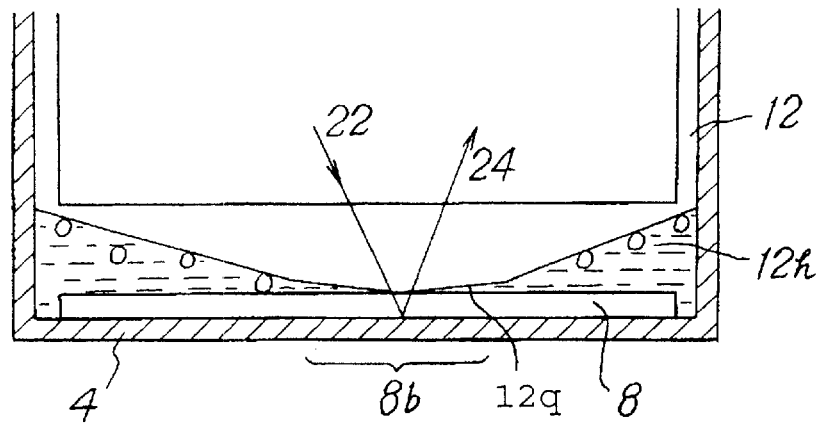
FIG. 5A is a section view showing an alternative bottom of a case for a liquid leakage sensor according to the present invention.
Figure 5B:
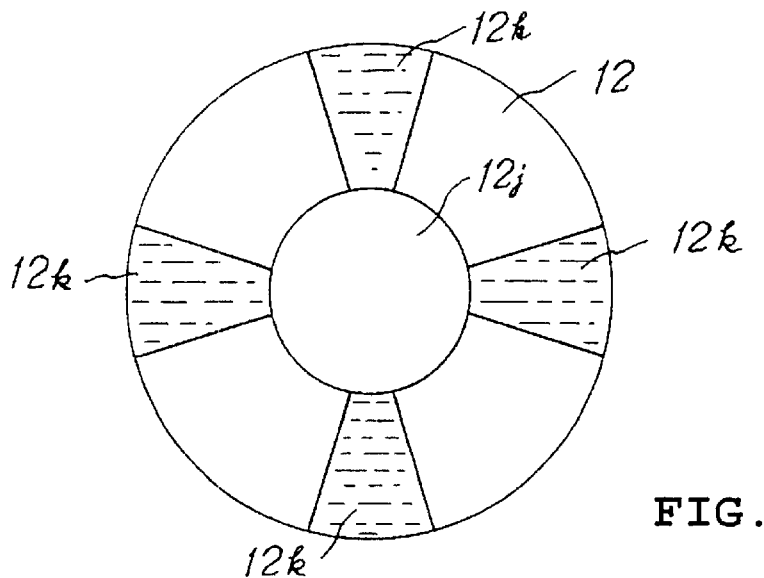
FIG. 5B shows yet another exemplary case bottom for a liquid leakage sensor according to the present invention.
Figure 5C:
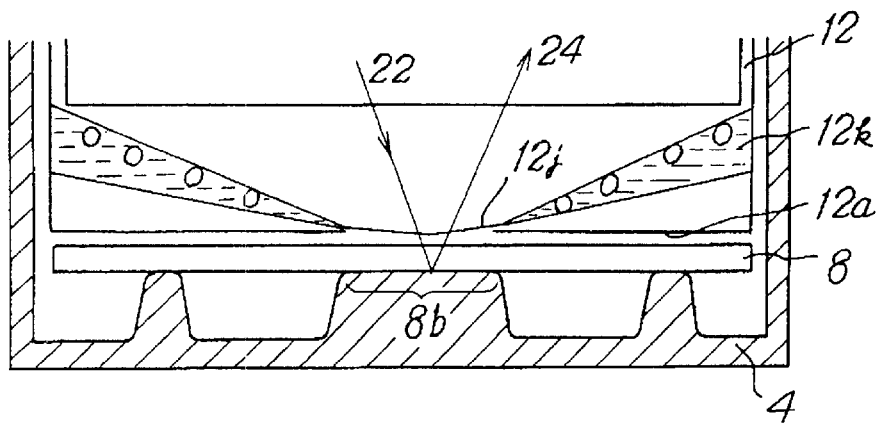
FIG. 5C is a section view describing the operation of this bottom.

A yet further alternative embodiment of the present invention is shown in FIGS. 5A–5C in contrast with FIGS. 1A and 1B. It should be noted that like parts are identified with like reference numerals in FIGS. 5A–5C, and the function of the liquid leakage sensor is the same.

A liquid leakage sensor according to this preferred embodiment differs, however, in that the bottom 12a of case 12 has a two-stage conical profile. More specifically, a conical tip 12q having a gradual slope to the horizontal is formed in the area corresponding to reflection area 8b of paper 8, and a steeper guide plane 12h for removing any bubbles occurring in the gap 10 to the outside of the case 12, are formed to prevent bubbles from collecting and becoming trapped in the conical tip 12q area covering the reflection area 8b of paper 8.

FIG. 5B is a plan view of a case 12 wherein the area of the case bottom 12a containing the reflection area 8b is shaped to form a typically conical protrusion 12j with bubble guide channels 12k recessed from the outside edge of case 12 toward the protrusion 12j. When a case 12 thus comprised is used and a large volume of liquid 2 leaks at once to conical tip 12q and protrusion 12j, the pressure of leaked liquid 2 penetrating the paper 8 is greater at the conical tip 12q than in other surrounding areas. Air absorbed in the reflection area 8b is thus expelled to the outside of conical tip 12q and protrusion 12j, and a high volume leak can be reliably detected.

Figure 6:
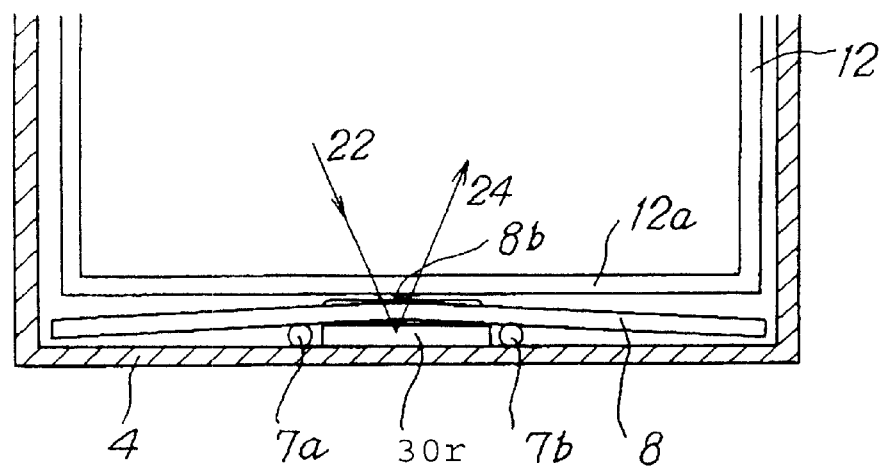
FIG. 6 is a section view showing a member 30 disposed below paper 8 for purging bubbles 7a, 7b from the reflection area 8b.

A yet further alternative embodiment of the present invention is shown in FIG. 6 in contrast with FIGS. 1A and 1B. It should be noted that like parts are identified with like reference numerals in FIG. 6, and the function of the liquid leakage sensor is the same.

In the embodiment shown in FIG. 6, a transparent or semi-transparent material, such as double-sided tape 30r, is affixed to the paper 8 and used to fasten the paper 8 to the bottom of holder 4. It should be noted that if a liquid adhesive is used for material 30r reaction of the liquid adhesive will cause the paper 8 to become transparent. A solid material is therefore preferable for use as the fixing agent 30r.

When thus comprised, the gap between paper 8 and bottom 12a of case 12 is narrower where the material 30r is affixed than at surrounding areas. As a result, the pressure in this area is greater than in surrounding areas when a leak occurs, and any bubble 7a, 7b is forced to the outside of the reflection area 8b. Experiments have demonstrated that liquid leaks can thus be stably and reliably detected.

Figure 7:
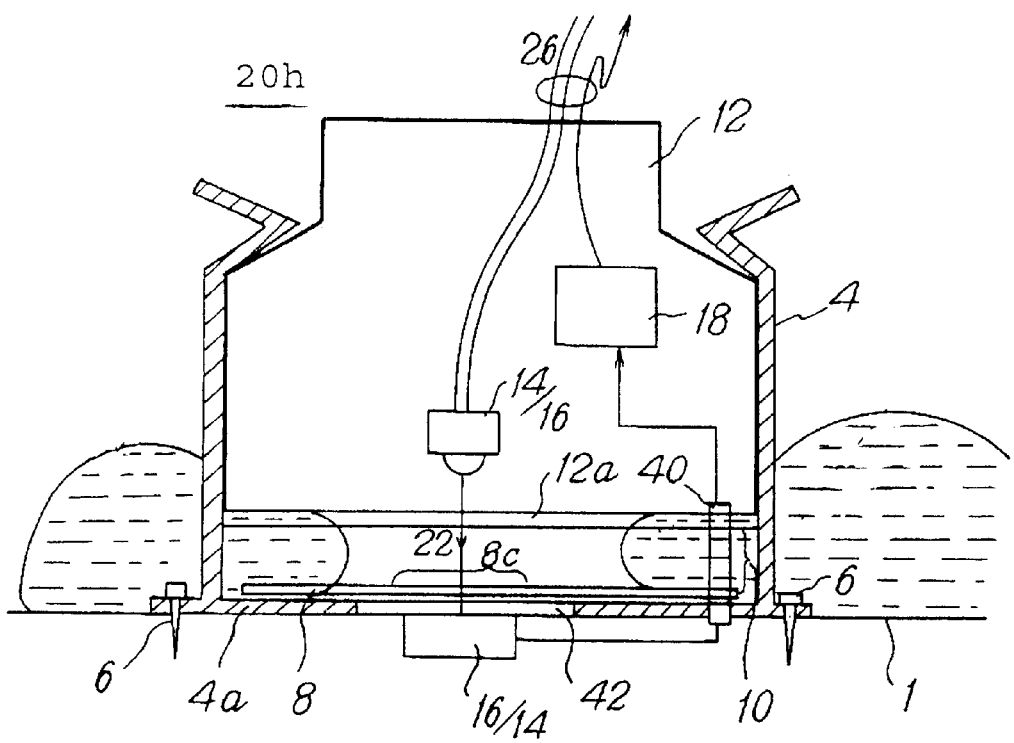
FIG. 7 is a section view describing the operation of a transmittance type liquid leakage sensor according to the present invention.
Figure 8:
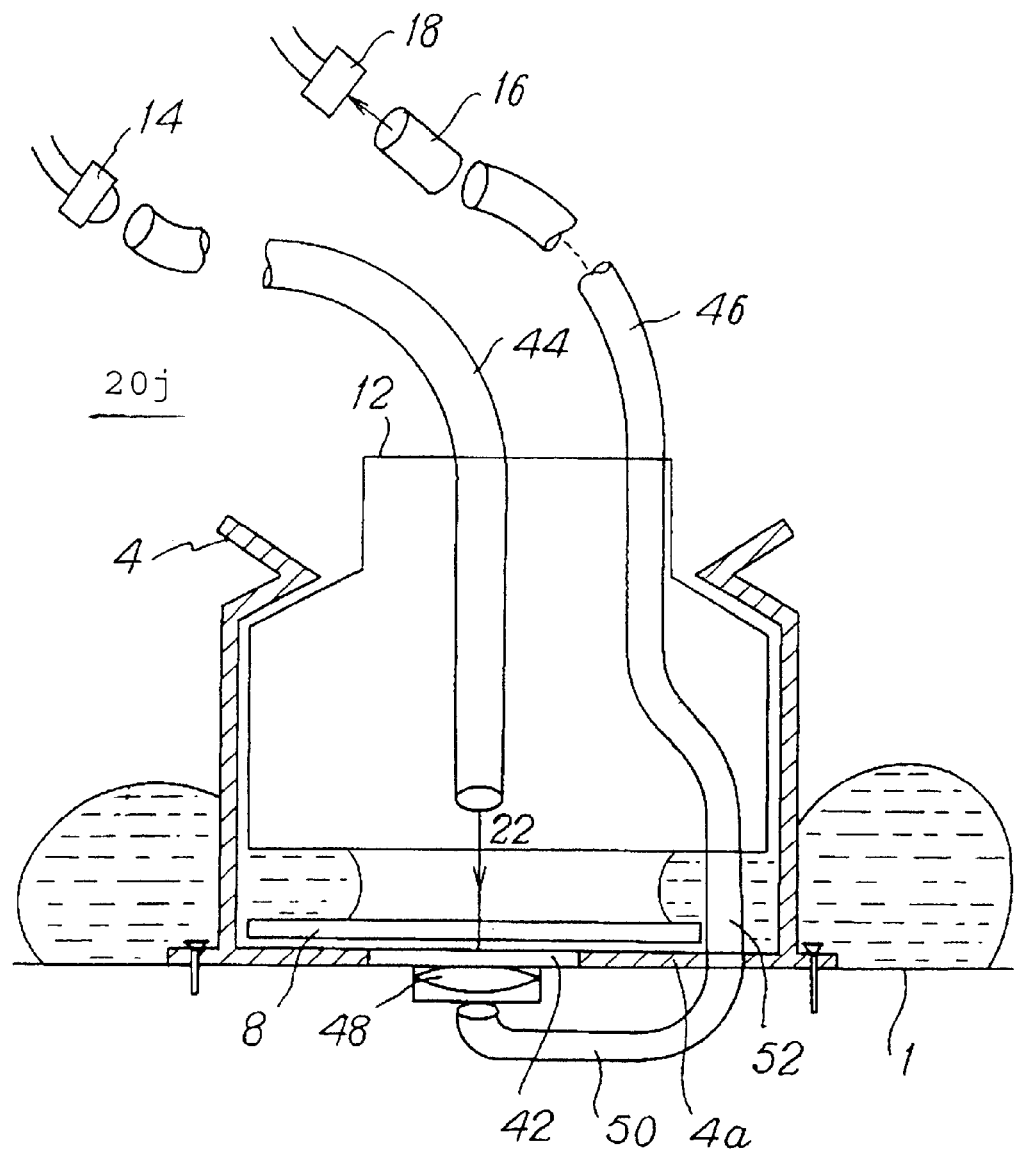
FIG. 8 is a section view describing the operation of an explosion-proof, reflection type liquid leakage sensor according to the present invention.

Further alternative embodiments of the present invention is shown in FIG. 7 and FIG. 8 in contrast with FIGS. 1A–1B and FIGS. 4A–4B. It should be noted that like parts are identified with like reference numerals in FIG. 7 and FIG. 8, and the function of each liquid leakage sensor is the same.

The liquid leakage sensors shown in FIG. 7 and FIG. 8 differs from that shown in FIGS. 1A–1B and FIGS. 4A–4B in that the sensors detect light passing through paper 8 in order to detect liquid leakage. Therefore, as shown in FIG. 7, the photodetector 16 or light source 14 is planted in the floor 1, a transparent plate 42 is placed thereabove in the holder 4, the paper 8 is placed over the transparent plate 42, and the case 12 and photodetector 16 or light source 14 placed in the floor 1 are connected by means of a connector 40.

The liquid leakage sensor shown in FIG. 8 is similar to that in FIG. 7, but differs in that it further eliminates the presence of electrical wiring in the liquid leakage detection part. More specifically, optical fiber or other light transmitting means 44 and 46 are used to emit light to and detect light passed through the reflection area 8b of paper 8. It is therefore possible for a liquid leakage sensor according to this preferred embodiment to very safely detect liquid leakage by means of transmitted light even when the leaked liquid 2 is volatile and presents the danger of combustion or explosion.

With a liquid leakage sensor thus comprised, light 22 from a remotely disposed light source 14 is guided by means of light transmitting means 44 to the bottom 12a of case 12 and emitted to the paper 8. Light passing through paper 8 is then gathered by lens 48 and transmitted by means of light transmitting means 50, optical connector 52, and light transmitting means 46 to a remotely located photodetector 16. The output of the photodetector 16 is then processed by a detection means 18 to detect, the presence of leaked liquid.

As previously described, the paper 8 is conventionally placed level to the bottom 4a of holder 4, and a case 12 in which the light source 14 or photodetector 16 is contained is inserted from above into the holder 4, thus disposing the paper 8 side of bottom 12a substantially parallel to the floor. As a result, when a large volume of liquid leaks at once to a reflection type liquid leakage sensor 20 as shown in FIG. 1A, wetting the floor 1, a bubble is formed at the reflection area 8b of paper 8. This prevents the reflection area 8b from turning transparent, and thus prevents detection of a high volume leak no matter how much time passes. This will also occur with a light transmitting type of liquid leakage sensor 20h or 20j, as shown in FIG. 7 or FIG. 8, if the same type of paper 8 is used.

As described with reference to FIGS. 2A–2D above, this problem can be avoided by creating an opening 80 in the paper 8, as shown in FIG. 2A, so that a time difference is created in the rate at which the leaked liquid permeates to the center light-passing area 8b from the outside edge parts of the paper 8. The present inventors discovered that by thus providing an opening 80, any bubble 7 forming in the conventional light-passing area 8b is guided to the opening 80 by the pressure created by the leaked liquid, thereby allowing the leaked liquid 2 to be absorbed in the light-passing area 8b, causing it to become transparent and thus enabling liquid leakage detection. We also demonstrated that said bubble 7 can be moved outside of the light-passing area 8b by disposing a protrusion 12b in the case bottom as shown in FIG. 4A.

We have also demonstrated that any bubble 7 can be prevented from stopping in the light-passing area 8b by providing a channel 12h, 12k for removing bubble 7 in the bottom 12a of case 12, as shown in FIGS. 5A–5C.

It will also be obvious that a plurality of the techniques shown in FIGS. 2A to 5C can also be combined in various ways.

As described above, by simply changing the paper 8 used in the liquid leakage sensor to one having an opening such as shown in FIG. 2A, an optical liquid leakage sensor according to the present invention can, without in any way lowering the liquid leakage detection capability of a conventional liquid leakage sensor and while enabling the holder and case of a conventional liquid leakage sensor to continue to be used, reliably detect liquid leakage even when the liquid is a combustible, volatile, or potentially explosive liquid, and even when accidents not considered by the conventional technology, such as a large volume of liquid leaking at once, occur.

Furthermore, when the holder 4 or case 12 is replaced or newly installed, a holder or case such as shown in any of FIGS. 3 to 5 can be used to achieve the same benefits noted above while continuing to use the same conventional paper 8 not having an- opening 80 formed therein.

Yet further, when a paper 8 as shown in FIG. 2A is used in combination with a case and holder as shown in any of FIGS. 3 to 5, the most important type of liquid leakage, that is, high volume leaks, can be quickly and accurately detected. The benefit of the present invention is therefore great in practical applications.

Figure 9A:
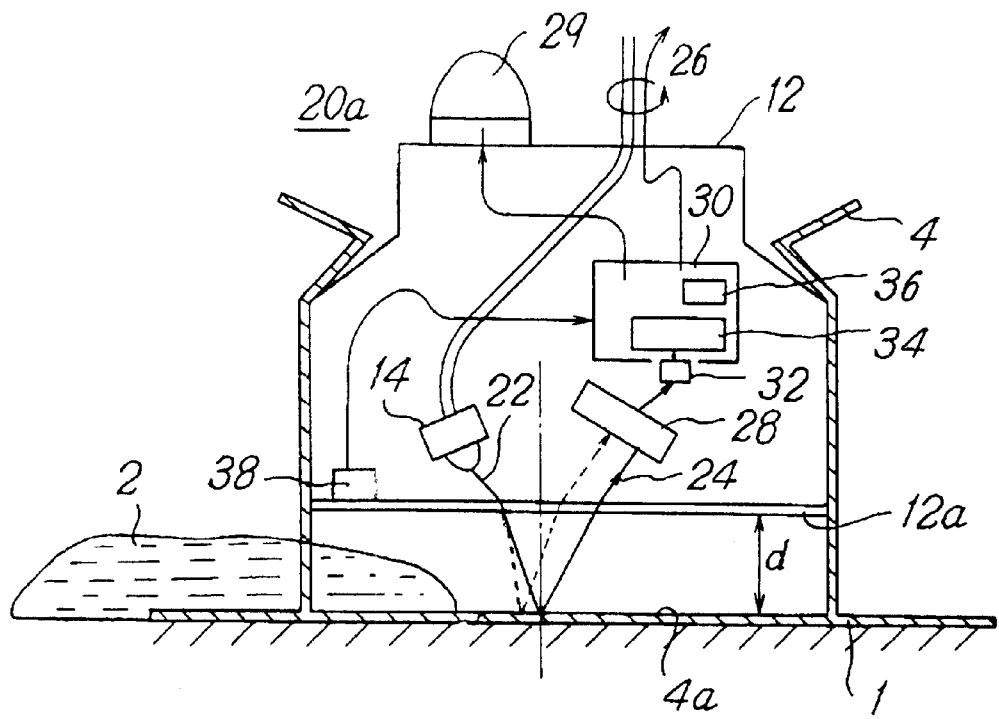
FIG. 9A is a section view of an exemplary liquid leakage sensor that does not use paper for detecting liquid leakage according to the present invention.
Figure 9B:
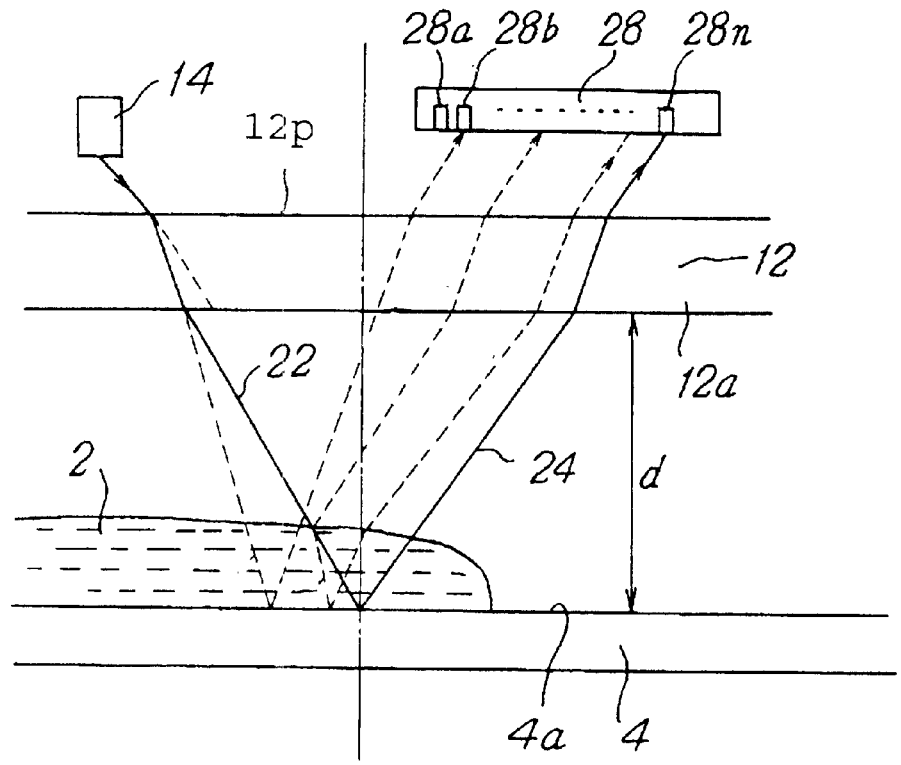
FIG. 9B is a section view showing the operating principle and reflection path of light in this liquid leakage sensor.

A yet further alternative embodiment of the present invention is shown in FIGS. 9A and 9B in contrast with FIGS. 1A and 1B. It should be noted that like parts are identified with like reference numerals in FIGS. 9A and 9B, and the function of the liquid leakage sensor is the same. This exemplary liquid leakage sensor 20b detects the distribution of a brightness pattern to detect liquid leakage. More specifically, instead of using a paper 8, the bottom 4a of holder 4 is coated an intermediate gray color, for example, and reflected light 24 is picked up by a linear or 2-dimensional photoelectric conversion element array sensor (referred to below as array sensor) 28 comprising a plurality of CCD or MOS photodiodes. Output from the array sensor 28 is then converted to a digital signal by A/D converter 32 at a predefined sampling frequency, and sequentially written to double buffer memory 34 of controller 30, which comprises a microprocessor 36.

A slope sensor 38 is further provided inside case 12. The slope sensor 38 outputs to the controller 30. Liquid leakage detection is also output as an electrical signal to an external device, and presented by means of a red LED, for example, on display device 29. The outside diameter of the holder 4 where it contacts the floor 1 is preferably at least 1.5 times the outside diameter of case 12 with consideration for preventing the liquid leakage sensor 20a from tipping over. The gap d between bottom 4a of holder 4 and the bottom 12a where case 12 contacts the leaked liquid is preferably adjustable according to the viscosity of the liquid to be detected.

Operating errors can also occur if the angle and gap between reflection plane 4a and array sensor 28 can be changed by, for example, an earth tremor or nearby movement of heavy objects. The case 12 is therefore preferably removable from the holder 4, and the case 12 and holder 4 are preferably constructed to prevent a change in gap d as a result of external vibration.

Penetration of external light noise from around the case 12 and extraneous reflections from the floor are also prevented by constructing the holder 4 from an opaque material.

The operation of a liquid leakage sensor thus comprised is described next below.

First, when no leaked liquid 2 is present, reflected light 24 from holder bottom 4a (reflection plane) is incident array sensor 28a to 28n, as shown in FIG. 9B. The brightness pattern at this time has a distribution, as shown in FIG. 10A. When leaked liquid 2 is present and forms a thin film on the floor 1, the distribution of the brightness pattern of reflected light 24 is as shown in FIG. 10B; when the leaked liquid 2 film becomes thicker (deeper), the pattern is as shown in FIG. 10C; when the bottom of the case 12 becomes immersed in the leaked liquid 2, the distribution of the brightness pattern of reflected light 24 is as shown in FIG. 10D. Detection of these various conditions can be handled by the microprocessor, for example, running the following processes using the output of elements 28a to 28n of the array sensor 28 written at a specific sampling frequency to the double buffer memory 34.

a) After compensating for the sensitivity of each photodetector element 28i (where i=a to n), the detection pattern is smoothed by, for example, a moving average process.

b1) The brightness peak of the smoothed photodetection pattern is then calculated, and the presence of liquid leakage is determined based on whether this position is within the no-leakage area.

b2) The center XG of the luminance distribution of the reflected light quantity of the smoothed photodetection pattern is then calculated using the following equation, and the presence of liquid leakage is determined based on whether this center position XG is within the no-leakage area.

$$XG = <E>R(j)*j/<E>j \quad (j=1 \text{ to } n) \tag{1}$$

where R(j) is the photodetection level, and j is the photodetection position.

b3) The rise and/or peak and/or falling part of the waveform of the brightness pattern of the reflected light is extracted from the pattern of reflected light from the liquid leakage area, and pre-stored as a leakage template pattern T(j) in a template memory, for example. A waveform position similar to the template pattern T(j) is then sought in the smoothed photodetection pattern using the following equation.

$$CR(m) = \frac{\sum (T(j+m) - TA)(R(j+m) - RA)}{\sqrt{\sum (T(j+m) - TA)^2} \sqrt{(R(j+m) - RA)^2}}$$

$$(j = 1 \sim k) \quad (m = 0 \sim n\text{-}k).$$

where T(j) is the template pattern; TA is the average of T(j), R(j) is the photodetection pattern, and RA is the average of R(j).

Next, if a brightness pattern with similarity to a template waveform greater than or equal to degree of similarity Thcr is detected at a position a specific distance from the no-leakage area, liquid leakage is determined to be present. If not, there is determined to be no liquid leakage.

c) If liquid leakage is detected, display device 29 is driven to display red, and the liquid leakage presence status is output by way of cable 26 to an external device.

It should be noted that by collecting reflected light from a wide area by means of a lens or other light gathering means, the presence of liquid leakage can be calculated using only two photodetection means using the processes noted in b1) and b2) above. With the correlation calculation shown in b3) above, it is preferable to collect reflection data from photodetection means at least four to eight locations.

It is therefore possible for a liquid leakage sensor 20a constructed as shown in FIG. 9 to reliably detect liquid leakage when the liquid begins to penetrate the reflection plane 4a by simply placing the liquid leakage sensor 20a on the floor and not using paper 8. It is furthermore possible to prevent the liquid leakage sensor 20a from tilting over by simply increasing the diameter of the holder 4, and it is therefore not necessary to fasten the sensor to the floor.

Figure 11:
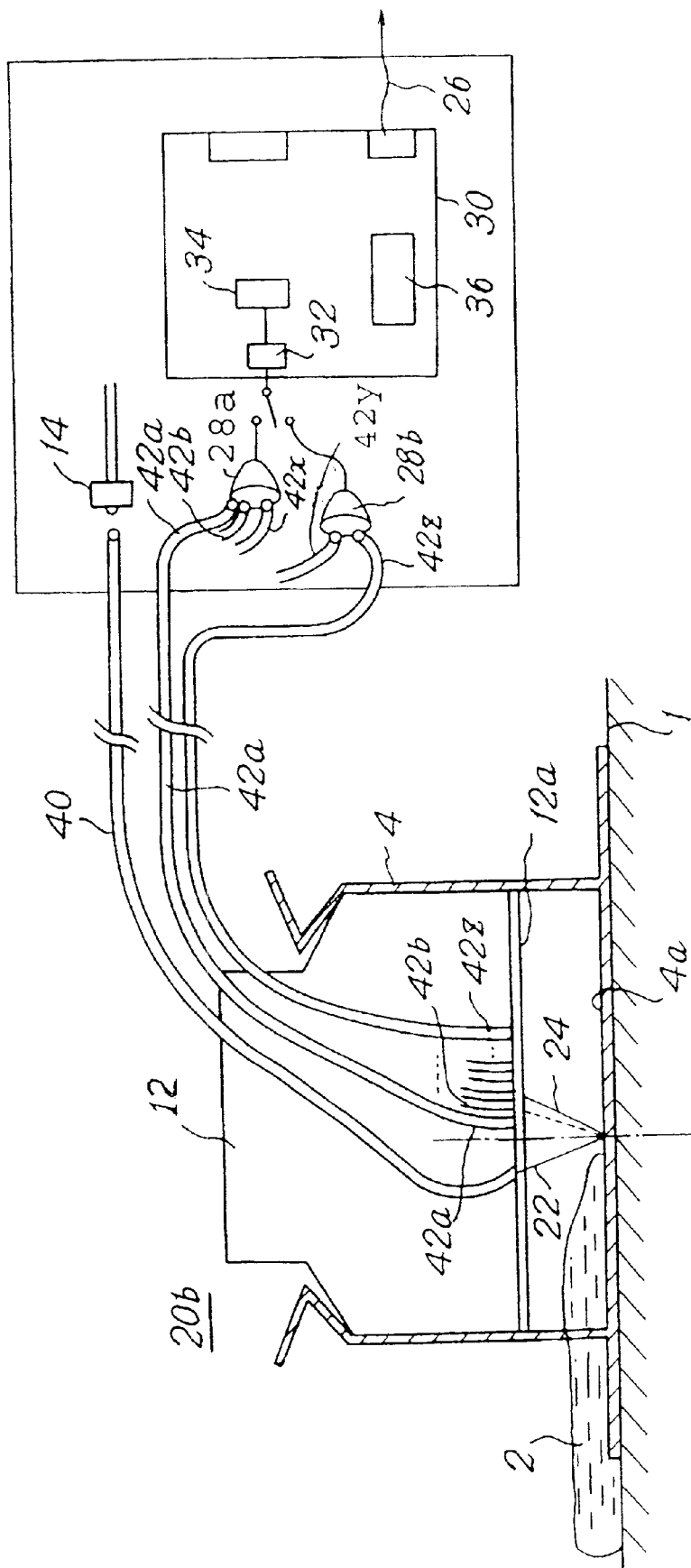
FIG. 11 is a section view describing the construction and operating principle of an explosion-proof liquid leakage sensor according to the present invention.

A yet further alternative embodiment of the present invention is shown in FIG. 11 in contrast with FIGS. 9A and 9B. It should be noted that like parts are identified with like reference numerals in FIG. 11, and the function of the liquid leakage sensor is the same. This exemplary liquid leakage sensor 20b also detects the distribution of a brightness pattern arrangement to detect liquid leakage.

The liquid leakage sensor shown in FIG. 11 differs from that shown in FIGS. 9A and 9B in that it eliminates the presence of electrical wiring in the liquid leakage detection part. More specifically, optical fiber or other light transmitting means 40 and 42a to 42z are used to emit light to and detect light passed through the reflection plane 4a. It is therefore possible for a liquid leakage sensor according to this preferred embodiment to very safely detect liquid leakage by means of reflected light even when the leaked liquid 2 is volatile and presents the danger of combustion or explosion.

With a liquid leakage sensor thus comprised, light 22 from a remotely disposed light source 14 is guided by means of light transmitting means 40 to the bottom 12a of case 12 and emitted to the reflection plane 4a at a specific angle. The reflected light is then detected by a plurality of light transmitting means 42a to 42z arrayed in a line, transmitted thereby to a remotely located photodetection means 28a and 28b, passed through A/D converter 32, and input to the controller 30.

When no leaked liquid 2 is present at the reflection plane 4a of the holder 4 in a liquid leakage sensor thus comprised, the output from photodetection means 28b is greater than the output from photodetection means 28a. When leaked liquid 2 penetrates the emission area of the reflection plane 4a, the combination of refraction by the leaked liquid 2 and reflected light increases the output from photodetection means 28a and relatively decreases the output of photodetection means 28b. The techniques shown in b1) or b2) above can therefore be used to detect the presence of leaked liquid 2.

It is therefore possible using a liquid leakage sensor as shown in FIG. 11 to very safely and reliably detect leakage of volatile liquids 2 as soon as a small amount of liquid leaks into the reflection plane 4a without using paper 8 and by simply placing the liquid leakage sensor 20b on the floor 11 without fastening the sensor 20b to the floor.

In addition, with a liquid leakage sensor constructed as shown in FIGS. 9A and 9B and FIG. 11, when a large volume of liquid leaks at once such that the case 12 becomes immersed in liquid, and bubbles form under the case bottom 12a, the reflection path of the emitted light is bent when the liquid penetrates to the reflection plane 4a, and a change appears in the output of photodetection means 28a and 28b. It is therefore possible to detect liquid leakage without being affected by bubbles.

Figure 12A:
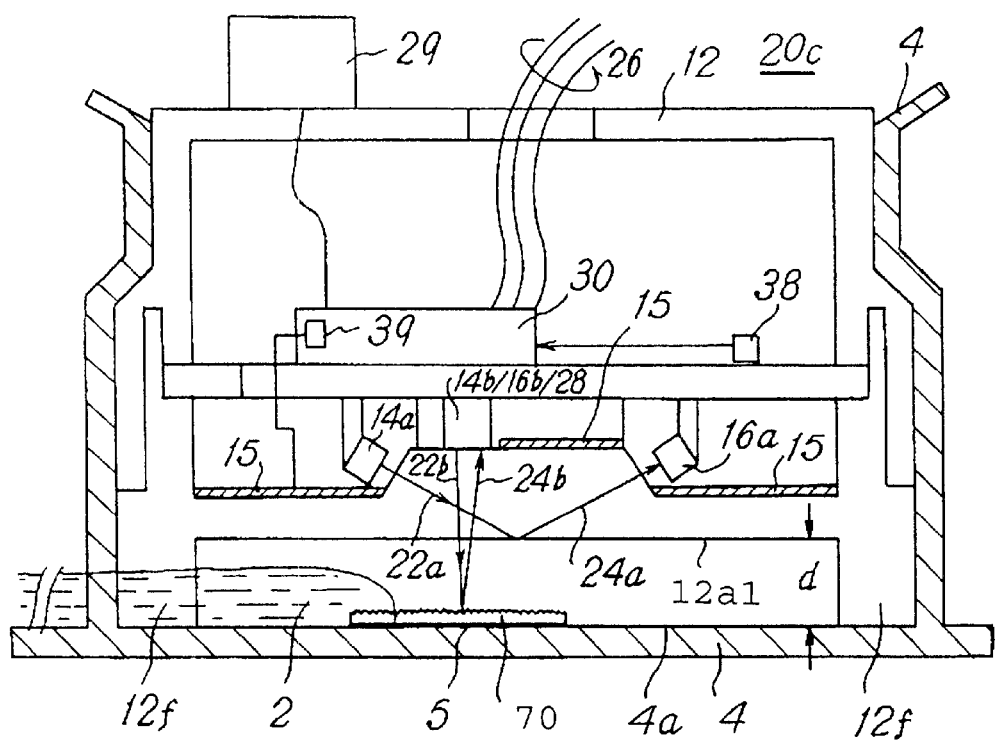
FIG. 12A is a section view showing an exemplary liquid leakage sensor according to the present invention using two types of reflection sensors.
Figure 12B:
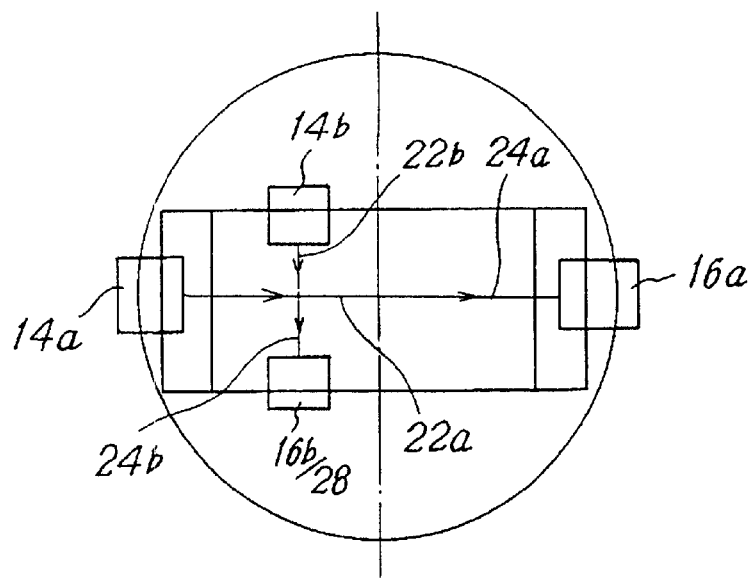
FIG. 12B shows the optical path therein.

A yet further alternative embodiment of the present invention is shown in FIGS. 12A and 12B in contrast with FIGS. 1A–1B and FIG. 9. It should be noted that like parts are identified with like reference numerals in FIGS. 12A and 12B, and the function of liquid leakage sensor 20c is the same.

In this exemplary liquid leakage sensor 20c, the light source 14a emits light 22a at an incidence angle greater than or equal to a critical angle to the reflection plane 12a1 where leaked liquid contacts the case bottom. Reflected light 24a from this emitted light 22a is detected by photodetector 16a and converted to an electrical signal.

A further light source 14b emits light 22b at an incidence angle less than this critical angle to a second reflection plane 7. This second reflection plane 7 is affixed by means of adhesive 5 to bottom 4a of holder 4, and is a glass or synthetic resin reflector having a textured surface. Reflected light 24b from this reflection plane 7 is detected by photodetector 16b or 28, converted to an electrical signal, and input to the controller 30.

A metallic foil or other light shield material 15 is further affixed to the inside of the case bottom 12a. An edge of this metallic light shield 15 is input to a capacitance sensor 39. This light shield material 15 is disposed to the bottom 12a except at the light emission surface and the area around the photodetectors where the reflected light is incident. As a result, extraneous reflected light is not detected from the floor when liquid leaks even if the floor is white or a mirror surface.

The operation of a liquid leakage sensor 20c thus comprised is described next below.

When the slope sensor 38 detects inclination exceeding a specified angle, it outputs an alarm signal. In a normal operating mode in which this alarm signal is not output, output from the photodetector 16 and output from the capacitance sensor 39 are checked to detect a drop in the amount of light reflected from the reflection plane 7 or a change exceeding a specified range in the output of capacitance sensor 39. If either of these conditions is met, it is determined that leaked liquid 2 has approached the reflection plane 7 or case bottom 12a and a liquid leakage detection signal is output.

It should be noted that if the photodetector 16b is changed to an array sensor 28 having a plurality of photodetection elements as shown in FIG. 9, a reflection plane 7 having a textured surface is unnecessary. Furthermore, the reliability of liquid leakage detection can be further improved when a large volume of leaked liquid 2 flows to the floor 1 at once because the output from photodetector 16a also changes.

As shown in FIG. 12B, light beams 22a and 22b are emitted perpendicularly to each other and there is therefore little optical interference therebetween. It should be noted, however, that interference between the light sources can be completely eliminated by driving the light sources 14a and 14b in alternating periods.

It is furthermore preferable to adjust the height d of the legs 12f of the case 12 according to the viscosity of the liquid being detected. In addition, attaching the removable holder 4 to the end of the case 12 can also eliminate the effects of the color and surface condition of the floor 1, and is therefore preferable.

Yet further, when the photodetector 16b and capacitance sensor 39 do not use holder 4, they can be used as a sensor to detect if the liquid leakage sensor 20c is raised from the floor 1.

A liquid leakage sensor constructed as shown in FIGS. 12A and 12B can thus reliably detect liquid leakage as soon as a small amount of liquid leaks to the floor. Furthermore, this detection is possible without using a detection paper, which is a consumable and a source of dust, and without requiring the liquid leakage sensor to be fastened to the floor. In addition, when a large volume of liquid leaks at once, the capacitance sensor 39 and total reflection plane 12a1 provide a redundant liquid leakage detection means to further improve the reliability of the liquid leakage sensor.

Figure 13:
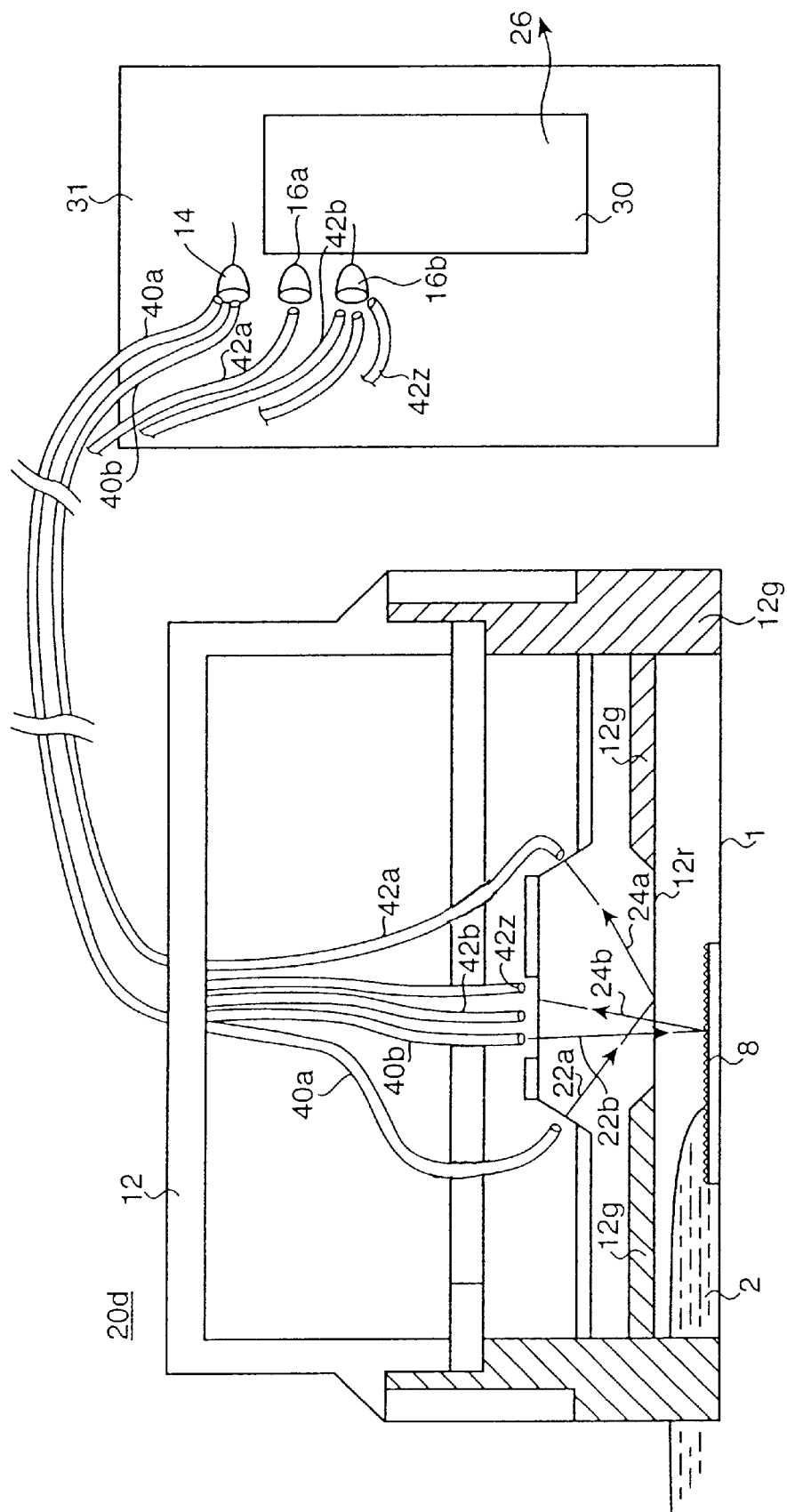
FIG. 13 is a section view showing an exemplary explosion-proof liquid leakage sensor according to the present invention using two types of reflection sensors.

A yet further alternative embodiment of the present invention is shown in FIG. 13 in contrast with FIG. 11 and FIGS. 12A–12B. It should be noted that like parts are identified with like reference numerals in FIG. 13, and the function of the liquid leakage sensor 20d is the same.

This liquid leakage sensor 20d differs from that shown in FIGS. 11, 12A, and 12B in that it eliminates the presence of electrical wiring in the liquid leakage detection part. More specifically, optical fiber or other light transmitting means 40a and 40b are used to emit light to emit light to reflection planes 12a1 and 70 at an incidence angle exceeding or an incidence angle less than a critical angle. The reflected light is then transmitted by light transmitting means 42a and 42b to 42z to remotely located photodetection means 16a and 16b. It is therefore possible for a liquid leakage sensor according to this preferred embodiment to very safely detect liquid leakage by means of reflected light even when the leaked liquid 2 is volatile and presents the danger of combustion or explosion.

The outside of the case bottom 12a is further coated by or comprises a synthetic resin or other light shield material 12g except at the light emission area and photodetection area, and is formed integrally with a light passing member 12a1, thus forming an optical structure whereby extraneous reflected light is not detected from the floor when liquid leaks even if the floor is white or a mirror surface, and ambient light noise does not enter even if the holder 4 is not used.

Light emitted from the light source 14 is transmitted in part by light transmitting means 40b to case 12 and emitted as light 22b at an incidence angle less than the critical angle to paper 8 placed on floor 1. The reflected light 24b is then guided by means of light transmitting means 42b to 42z to a remotely located photodetector 16b where the presence of leaked liquid 2 is detected. It will also be obvious that the reflected light can be alternatively detected directly from the floor 1, eliminating the paper 8 placed thereon.

A liquid leakage sensor 20d thus comprised is resistant to the effects of outside light even when a holder 4 is not used, and can quickly detect liquid leakage at the earliest leakage stage when liquid 2 does not leak in a volume sufficient to cover the reflection plane 12a.

In addition, volatile liquids can be very safely detected because no electrical signal is present in the liquid leakage detection part.

Furthermore, if the entire reflection plane 12a is a protruding structure, liquid leakage is redundantly checked even when a large volume of liquid leaks at once, and the reliability of the detection process can be further improved.

Yet further, it will also be obvious that a case head comprising an integrally formed light shield member 12g and light passing member 12a1 can be applied to a liquid leakage sensor not using paper 8 as shown in FIG. 9 to FIG. 13, in the same way as shown in FIG. 13.

An optical liquid leakage sensor according to the present invention as described above can detect liquid leakage with the liquid leakage sensor placed directly on the floor without using test paper. The sensor layout can also be changed, and the sensor can be installed, very simply and in little time.

In addition, an anti-tilt feature can be achieved by removably mounting the holder 4 to the end of the case in which the sensor is housed, liquid leakage detection that is unaffected by the color or surface condition of the floor can be achieved, and a high reliability liquid leakage sensor that is not caused to misoperate by vibration or impact from earth tremors or nearby movement of heavy equipment can be achieved.

Yet further, whereas a conventional liquid leakage sensor cannot detect liquid leakage until the liquid leaks in a volume sufficient to create a depth of 2 to 4 mm, a liquid leakage sensor according to the present invention can sufficiently and reliably detect leaks at the earliest stages from a liquid depth of only 0.1 mm on the floor so that accidents from severe leaks can be prevented.

It is yet further possible to very safely detect leaks of volatile, combustible, and potentially explosive liquids by using a liquid leakage sensor in which no electrical wiring is used in the liquid leakage detection part.

Yet further, a case head comprising an integrally formed light shield member 12g and light passing member 12a1 is resistant to the effects of outside light, eliminates need for a holder 4, and simplifies the construction of the case 12.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A liquid leakage sensor having a white paper that becomes transparent when liquid is absorbed; a paper holder for holding said paper level, said paper holder being placed on a floor and having a bottom thereof forming a reflector; a case inserted into said holder and having a transparent or semi-transparent bottom plate; a light source for emitting light to said paper through said transparent or semi-transparent bottom plate; a photodetection means for detecting light reflected from said holder bottom; and a sensing means for detecting liquid leakage based on data from the photodetection means; said light source and photodetection means being integrally housed in said case, and said case and holder being disposed with a gap therebetween so that when leaked liquid contacts an edge of said paper the leaked liquid quickly permeates the paper;

or a liquid leakage sensor having a white paper that becomes transparent when liquid is absorbed; a paper holder for holding said paper level, the bottom of the paper holder forming a reflector; a case inserted into said holder and having a transparent or semi-transparent bottom plate; a light source for emitting light; a first light transmitting means for guiding light emitted from said light source to said paper through the transparent or semi-transparent bottom plate of the case; a second light transmitting means for detecting and transmitting reflected light from the holder bottom; a photodetection means for detecting light from said second light transmitting means; and a sensing means for detecting liquid leakage based on data from the photodetection means; an end of said first light transmitting means and an end of said second light transmitting means forming an integrated light path housed inside said case, and said case and holder being disposed with a gap therebetween so that when leaked liquid contacts an edge of said paper the leaked liquid quickly permeates the paper;

wherein said paper has a circular or noncircular shape; and an asymmetrical opening formed in a middle part of the paper except in a reflection area and outside edge part of the paper, said opening being asymmetrical to the reflection area so that a bubble is not held in the reflection area even when a large volume of liquid leaks at once, said reflection area being detected by the photodetection means.

2. A liquid leakage sensor as described in claim 1, wherein the light transmitting means is optical fiber.

* * * * *